United States Patent
Li et al.

(10) Patent No.: US 10,747,935 B2
(45) Date of Patent: Aug. 18, 2020

(54) IDENTIFICATION OF HOTSPOTS IN CONGESTION ANALYSIS DURING PHYSICAL DESIGN OF INTEGRATED CIRCUIT

(71) Applicant: International Business Machines Corporation, Armonk, NY (US)

(72) Inventors: Zhichao Li, Austin, TX (US); Yaoguang Wei, Austin, TX (US); Diwesh Pandey, Bangalore (IN); Gustavo Enrique Tellez, Essex Junction, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/240,113

(22) Filed: Jan. 4, 2019

(65) Prior Publication Data
US 2020/0218789 A1    Jul. 9, 2020

(51) Int. Cl.
G06F 30/00    (2020.01)
G06F 30/394    (2020.01)
G06F 30/392    (2020.01)

(52) U.S. Cl.
CPC .......... G06F 30/394 (2020.01); G06F 30/392 (2020.01)

(58) Field of Classification Search
CPC .................................................... G06F 30/394
USPC ....................................................... 716/130
See application file for complete search history.

(56) References Cited

U.S. PATENT DOCUMENTS

| | | | |
|---|---|---|---|
| 5,784,289 A | 7/1998 | Wang | |
| 5,856,927 A | 1/1999 | Greidinger et al. | |
| 5,875,117 A | 2/1999 | Jones et al. | |
| 7,251,800 B2 | 7/2007 | McElvain et al. | |
| 7,725,861 B2 | 5/2010 | Cheng et al. | |
| 7,926,017 B2 | 4/2011 | Chang et al. | |
| 7,971,174 B1 * | 6/2011 | Khalsa | G06F 17/5077 716/118 |

(Continued)

OTHER PUBLICATIONS

Anonymous, "A novel approach to routing congestion mitigation with local box movement", IPCOM000216279D, Mar. 28, 2012, pp. 1-7.

(Continued)

*Primary Examiner* — Suchin Parihar
(74) *Attorney, Agent, or Firm* — Cantor Colburn LLP; Erik Johnson

(57) ABSTRACT

A method of performing physical design of an integrated circuit includes subdividing each metal layer of a plurality of metal layers of the integrated circuit into a plurality of g-cells. Each metal layer has either horizontal or vertical tracks, the g-cells of the metal layers with horizontal tracks have vertical edges between adjacent ones of the g-cells, and the g-cells of the metal layers with vertical tracks have horizontal edges between adjacent ones of the g-cells. The method includes determining congestion for each metal layer as congestion values associated with the horizontal edges or the vertical edges of the metal layer, identifying hotspots for each metal layer based on the congestion values of the metal layer, determining a penalty associated with the hotspots of each metal layer, determining a congestion metric for each metal layer based on the penalty, and performing routing of the wires based on the congestion metric.

20 Claims, 7 Drawing Sheets

(56) References Cited

U.S. PATENT DOCUMENTS

| | | | |
|---|---|---|---|
| 8,584,070 B2 | 11/2013 | Alpert et al. | |
| 8,839,171 B1 | 9/2014 | Varadarajan et al. | |
| 8,863,062 B2 | 10/2014 | Chuang et al. | |
| 9,940,422 B2 | 4/2018 | Hsu et al. | |
| 2008/0301612 A1* | 12/2008 | Buehler | G06F 30/392 |
| | | | 716/122 |
| 2010/0190277 A1* | 7/2010 | Lin | G06F 17/5081 |
| | | | 438/17 |
| 2017/0286585 A1* | 10/2017 | Sridhar | G06F 17/5072 |

OTHER PUBLICATIONS

Anonymous, "Congestion mitigation by Congestion Optimized Library Cell Swapping and Selective Standard Cell Repulsion", IPCOM000221143D, Aug. 30, 2012, pp. 1-10.

* cited by examiner

| | | | | | |
|---|---|---|---|---|---|
| 0.5 | 0.6 | 0.7 | 0.6 | 0.8 |
| 0.3 | 0.6 | 0.1 | 0.4 | 1.1 |
| 0.5 | 0.4 | 0.7 | 0.8 | 0.9 |
| 0.6 | 0.3 | 0.7 | 0.7 | 0.8 |

410

| | number of values | ACE metric |
|---|---|---|
| ACE(0.5) | 1 | 1.1 → 110% |
| ACE(1) | 1 | 1.1 → 110% |
| ACE(10) | 2 | average (1.1, 0.9) → 1 → 100% |
| ACE(20) | 4 | average (1.1, 0.9, 0.8, 0.7) → 0.9 → 90% |

420 wACE = average(ACE(p1), ACE(p2), ACE(p3), ACE(p4))

IDENTIFICATION OF HOTSPOTS IN CONGESTION ANALYSIS DURING PHYSICAL DESIGN OF INTEGRATED CIRCUIT

BACKGROUND

The present invention relates to integrated circuit development, and more specifically, to the identification of hotspots in congestion analysis during the physical design of the integrated circuit.

The development of an integrated circuit (i.e., chip) involves several phases such as the logic design phase, the physical design phase, and the fabrication (i.e., manufacturing) phase. Many of the phases or processes that are part of the phases can be performed iteratively. During the physical design phase, placement of the components and routing of the wires that interconnect components is determined. As the density of components and the number of metal layers increases, the routing process becomes more challenging. Specifically, routing wires to avoid congested areas becomes more difficult. The management of congestion is necessary for both performance and cost. For example, high congestion can require an increased die size or more metal layers. Further, long wire routes resulting from congestion can increase noise and create new critical paths that affect signal integrity and timing. A congestion map can indicate areas with relatively higher densities of components and wires. However, areas of congestion can change based on placement, buffering, and layer assignment over iterations of the physical design. In addition, the relative arrangement of areas of high congestion can affect routing.

SUMMARY

Embodiments of the present invention are directed to systems and methods to perform physical design of an integrated circuit. The method includes subdividing each metal layer of a plurality of metal layers of the integrated circuit into a plurality of g-cells. Each metal layer has either horizontal tracks or vertical tracks, the plurality of g-cells of the plurality of metal layers with horizontal tracks have vertical edges between adjacent ones of the plurality of g-cells, and the plurality of g-cells of the plurality of metal layers with vertical tracks have horizontal edges between adjacent ones of the plurality of g-cells. The method includes determining congestion for each metal layer as congestion values associated with the horizontal edges or the vertical edges of the metal layer, identifying hotspots for each metal layer based on the congestion values of the metal layer, determining a penalty associated with the hotspots of each metal layer, determining a congestion metric for each metal layer based on the penalty, and performing routing of the wires based on the congestion metric. A comparison of the congestion metric of a first metal layer among the plurality of metal layers to the congestion metric of a second metal layer among the plurality of metal layers indicates whether the routing of the wires is preferable in the first metal layer or in the second metal layer.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, the routing task of the physical design phase includes consideration of congestion. Generally, a complete chip can be subdivided into areas referred to as g-cells. Specifically, each metal layer of the chip can be subdivided into g-cells. A given metal layer has all the tracks for the formation of wires oriented in one direction. That is, metal layer 1 (M1) can have all the tracks oriented horizontally according to a given point of view, while metal layer 2 (M2) can have all the tracks oriented vertically according to the same point of view. Horizontal and vertical are used for explanatory purposes as relative terms such that horizontal and vertical tracks are perpendicular to each other. The horizontal or vertical edges (i.e., borders between g-cells) of the g-cells indicate congestion. Specifically, a vertical edge indicates horizontal congestion (for horizontal wires that intersect the vertical edge between adjacent g-cells) and a horizontal edge indicates vertical congestion (for vertical wires that intersect the horizontal edge between adjacent g-cells). The congestion value for an edge is given by usage/capacity. That is, the number of tracks at the edge that are used as wires provides the usage value at the edge, and the total number of tracks at the edge (e.g., wires, empty tracks) with the number of blockages subtracted provides capacity at the edge. Average congestion of a specified percentage of the most congested edges is used to obtain an average edge congestion metric referred to as an ACE metric. For example, ACE (10) gives the ACE metric for the 10 percent (%) of the edges that are most congested. A weighted ACE metric, wACE, is also currently used.

While the wACE metric can provide some information about congestion, that information can be insufficient. For example, one large area of congestion and multiple smaller areas can result in the same ACE metric. Thus, the metric does not convey that the larger area is more difficult to route, for example. Embodiments of the invention relate to the identification of hotspots in congestion analysis during the physical design of the integrated circuit. A hotspot refers to an edge with a congestion value exceeding a threshold value.

The proximity of hotspots in a cluster is taken into account to generate the new congestion metric according to one or more embodiments of the invention. The improved metric can be used for congestion-driven placement and to track improvement in placement (e.g., congestion mitigation) over iterations of the physical design phase. The improved metric can be determined for multiple candidate physical synthesis solutions in order to select one of the candidates based on the metric results. Further, the improved metric can be used to predict whether a design is routable before performing any detailed routing.

Figure 1:
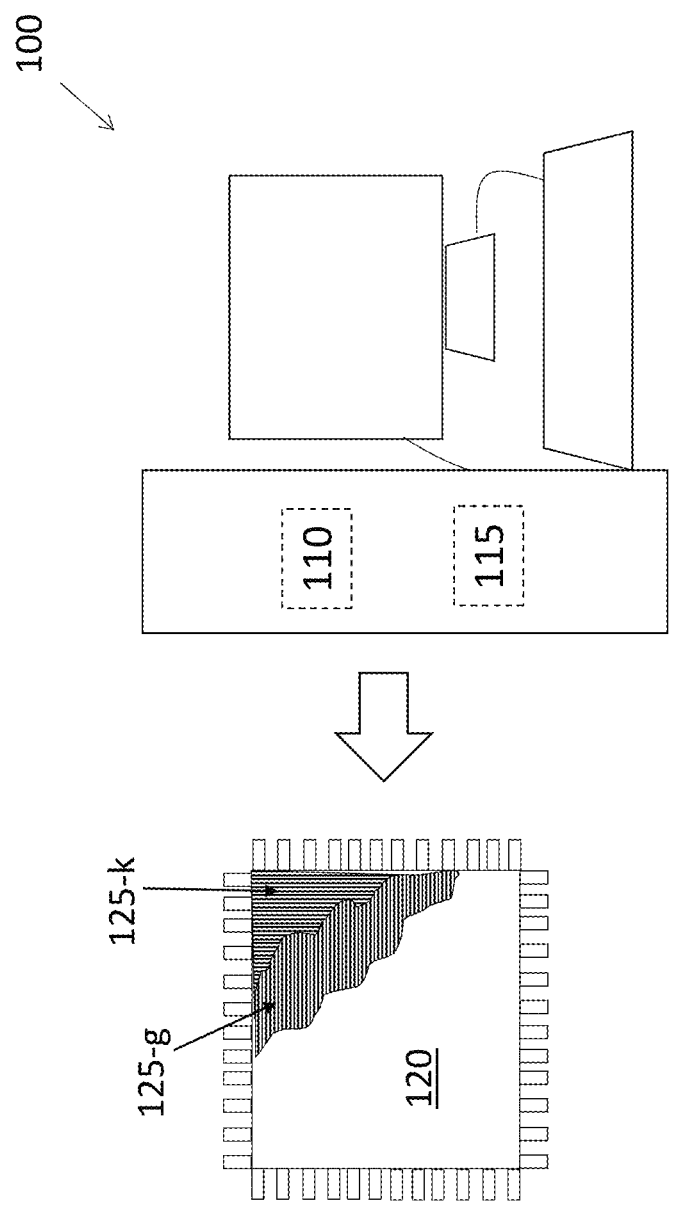
FIG. 1 is a block diagram of a system to perform identification of hotspots during congestion analysis as part of the physical design phase of integrated circuit development according to one or more embodiments of the invention.

FIG. 1 is a block diagram of a system 100 to perform identification of hotspots during congestion analysis as part of the physical design phase of integrated circuit development according to one or more embodiments of the invention. The system 100 includes processing circuitry 110 and memory 115 that is used to generate the design that is ultimately fabricated into an integrated circuit 120. A cutaway view is used to show two exemplary metal layers 125-g, 125-k (generally referred to as 125) among the metal layers 125 that are stacked within the integrated circuit 120. The memory 115 can store the design (e.g., logic elements, metal layers 125), as well as instructions processed by the processing circuitry 110. The steps involved in the fabrication of the integrated circuit 120 are briefly described herein and with reference to FIG. 7. The physical layout is finalized, in part, based on the identification of hotspots in the congestion map according to embodiments of the invention. The finalized physical layout is provided to a foundry. Masks are generated for each layer of the integrated circuit 120 based on the finalized physical layout. Then, the wafer is processed in the sequence of the mask order. The processing includes photolithography and etch. The fabrication is further discussed with reference to FIG. 7.

Figure 2:
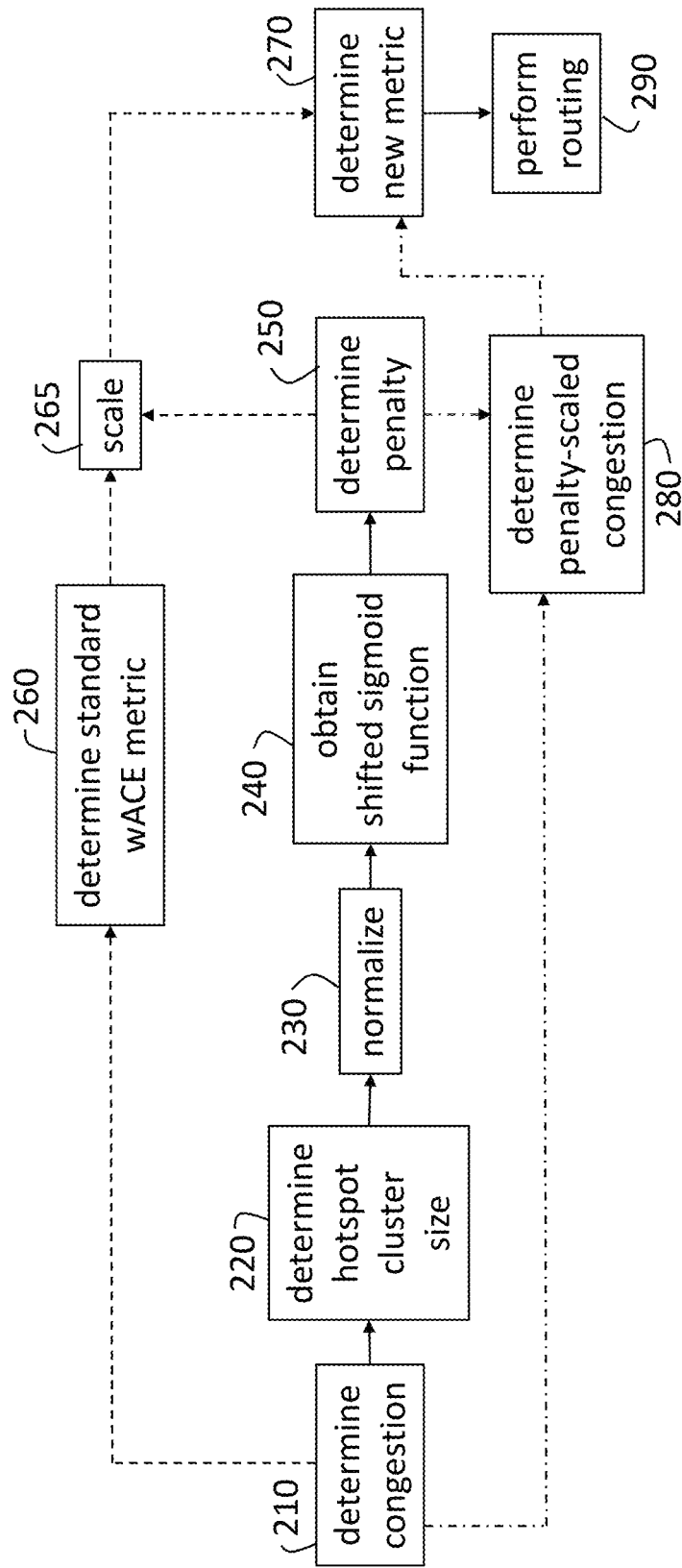
FIG. 2 shows an exemplary process flow of a method of identifying hotspots during congestion analysis as part of the physical design phase of integrated circuit development according to two or more embodiments of the invention.

FIG. 2 shows an exemplary process flow of a method of identifying hotspots during congestion analysis as part of the physical design phase of integrated circuit development according to two or more embodiments of the invention. The processes shown in FIG. 2 facilitate the consideration of hotspots in the determination of a new metric to be used in routing. As previously noted, the existing wACE metric does not sufficiently characterize congestion because it cannot distinguish between different scenarios that result in the same wACE metric value (e.g., multiple small and far-apart areas of congestion, two adjacent areas of congestion). By determining a penalty resulting from hotspots (at block 250), the new metric can be determined (at block 270) in more than one way. Each of the two process flows illustrated in FIG. 2 are detailed. The processes from blocks 210 through 250 are common to both process flows and are discussed first.

Figure 3:
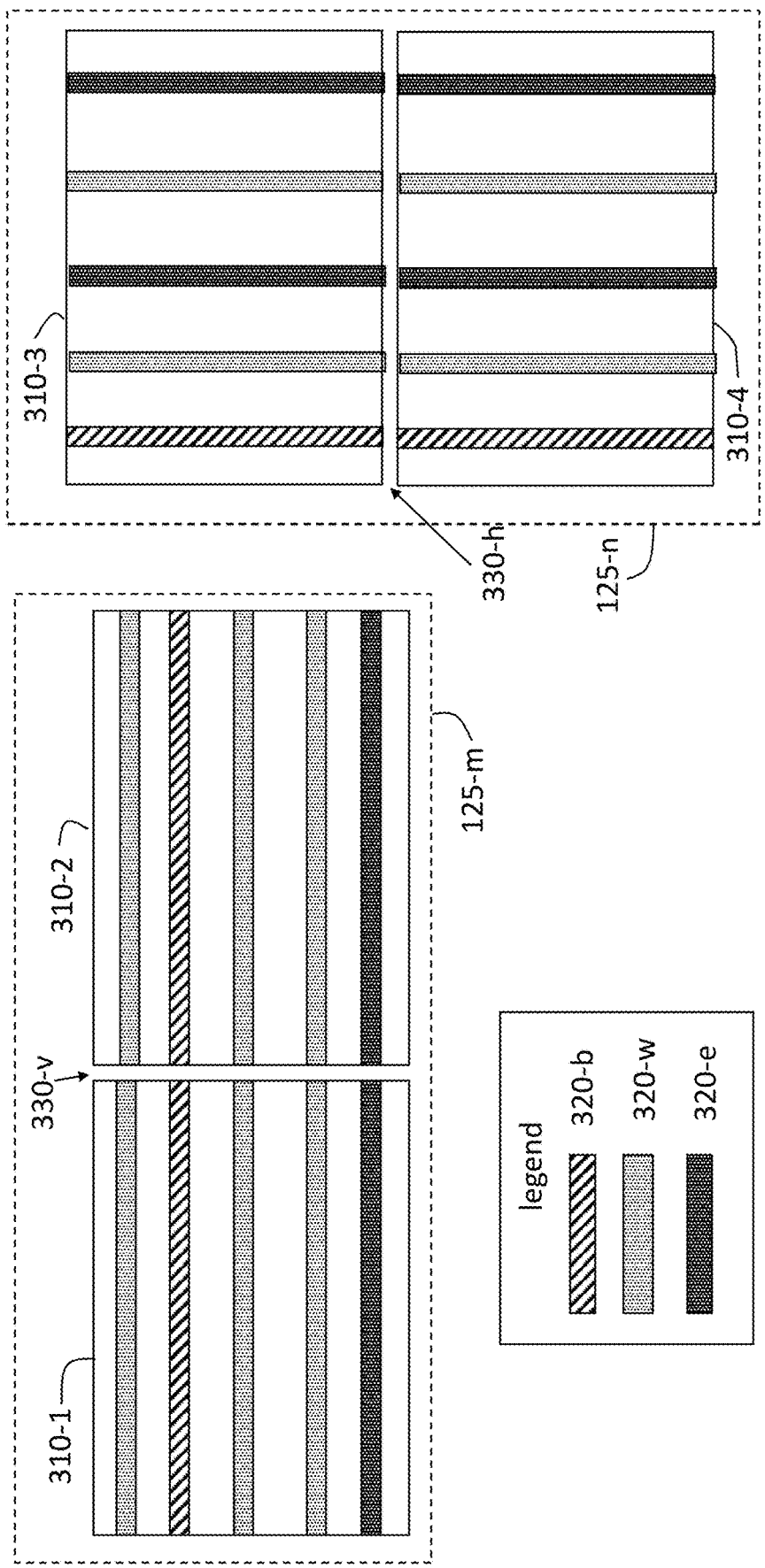
FIG. 3 depicts exemplary g-cells to illustrate the process of determining congestion in the process flow shown in FIG. 2.

At block 210, determining congestion is performed for each g-cell 310 (FIG. 3). The process at block 210 is further discussed with reference to FIG. 3. Each metal layer 125 of the integrated circuit 120 can be subdivided into g-cells 310. Based on the congestion determined for each g-cell 310, the processes include determining hotspot cluster size, at block 220. This process is detailed with reference to FIG. 5. Based on normalizing, at block 230, the result is used in obtaining a shifted sigmoid function (610, FIG. 6), at block 240. These processes are detailed with reference to FIG. 6. Determining a penalty, at block 250, is based on the shifted sigmoid function 610 obtained at block 240. The penalty ensures that the relative size of a hotspot cluster 520 (FIG. 5) is considered in the new metric (determined at block 270) so that the actual challenges to routing within a particular metal layer 125 are properly reflected. As previously noted, once the penalty is determined, at block 250, the new metric can be determined, at block 270, in more than one way. Each of the exemplary embodiments is detailed.

According to one exemplary embodiment of the process flow, the congestion determination, at block 210, can also be used in determining the standard weighted metric, the wACE metric, at block 260. This process is detailed with reference to FIG. 4. Based on the penalty determined at block 250, the standard wACE metric (obtained at block 260) is scaled, at block 265, in order to determine the new metric (at block 270). The scaling is further discussed with reference to FIG. 6. According to another exemplary embodiment of the process flow, the penalty determined at block 250 is used to determine penalty-scaled congestion, at block 280. This penalty-scaled congestion is then used to determine the new metric, at block 270. That is, just as the originally obtained congestion (at block 210) can be used to determine the standard wACE metric (at block 260), the penalty-scaled congestion (at block 280) can be used to determine the new metric (at block 270). The penalty-scaled congestion is a better reflection of how difficult routing is in a given part of a given metal layer 125 than the computed congestion value. This is also further discussed with reference to FIG. 6. The new metric is determined (at block 270) for each metal layer 125 of the integrated circuit 120 such that the new metric facilitates a determination of which metal layers 125 are and are not best-suited for further routing.

Performing routing, at block 290, is in consideration of the new metric. As previously noted, the net metric associated with each metal layer 125 can be used to determine which metal layers 125 are suited for additional routing. In addition, the improved metric can be determined for multiple candidate physical synthesis solutions in order to select one of the candidates based on the metric results. Further, the improved metric can be used to predict whether a design is routable before performing any detailed routing. The routing performed at block 280 using the new metric determined according to one or more embodiments of the invention facilitates the subsequent fabrication of the integrated circuit 120 as discussed with reference to FIG. 7.

FIG. 3 depicts exemplary g-cells 310 to illustrate the determination of congestion at block 210 of FIG. 2. Four exemplary g-cells 310-1, 310-2, 310-3, 310-4 (generally referred to as 310) are shown in FIG. 3. As previously noted, the integrated circuit 120 includes multiple metal levels, and all the tracks of a given metal level and, thus, the tracks of all the g-cells 310 of the same metal level, are oriented in the same direction. Thus, the exemplary g-cells 310-1 and 310-2, which have horizontal tracks, are from a given metal level Mx, and the exemplary g-cells 310-3 and 310-4, which have vertical tracks, are from a different metal level My (than g-cells 310-1 and 310-2 of metal level Mx). The vertical edge 330-v between g-cells 310-1 and 310-2 and the horizontal edge 330-h between g-cells 310-3 and 310-4 are indicated. For explanatory purposes, the edges 330-h and 330-v (generally referred to as 330) are shown within a gap between adjacent g-cells 310. However, the g-cells 310 are only a construct for the purposes of congestion analysis, and the tracks shown in FIG. 3 would be continuous through adjacent areas indicated as g-cells 310. A legend defines pattern coding for the different tracks. Specifically, the patterns used to indicate blocked tracks 320-b, wires 320-w, and empty tracks 320-e are defined.

Thus, at the horizontal edge 330-h, there are two wires 320-w, two empty tracks 320-e, and one blocked track 320-b, and, at the vertical edge 330-v, there are three wires 320-*w*, one empty track 320-*e*, and one blocked track 320-*b*. As previously noted, congestion can be determined (at block 210, FIG. 2) as usage (number of wires)/capacity (total number of tracks−blocked tracks). In the exemplary case shown in FIG. 3, the horizontal edge 330-*h* sees a usage of 2 (two wires 320-*w*) and a capacity of 4 (five total tracks—one blocked track), and the vertical edge 330-*v* sees a usage of 3 (three wires 320-*w*) and a capacity of 4 (five total tracks—one blocked track). Thus, congestion at the horizontal edge 330-*h*, is 2/4 or 0.5, and congestion at the vertical edge 330-*v*, is 3/4 or 0.75. Generally, at block 210, congestion for all the vertical edges 330-*v* between all the g-cells 310 of metal layer 125-*m*, congestion for all the horizontal edges 330-*h* between all the g-cells 310 of metal layer 125-*n*, and congestion for all the g-cells 310 of other metal layers 125 of the integrated circuit 120 can be determined as described.

Figure 4:
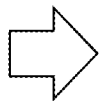
FIG. 4 illustrates an exemplary determination of the wACE metric in the process flow shown in FIG. 2.
Figure 4:
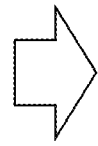

FIG. 4 illustrates an exemplary determination of the wACE metric, at block 260 (FIG. 2). Table 410 shows the congestion values computed according to the process discussed with reference to FIG. 3 (at block 210, FIG. 2). The twenty congestion values shown in table 410 can be for an exemplary metal layer 125 with twenty horizontal edges 330 between vertically oriented tracks or twenty vertical edges 330 between horizontally oriented tracks. The average congestion of some percentage of the most congested edges (ACE) is determined for four different percentage values, as shown in table 420. For example, ACE(0.5) refers to the highest 0.5% of the congestion values shown in table 410, and ACE(10) refers to the highest 10% of the congestion values shown in table 410.

Because there are twenty total congestion values shown in table 410, the highest 0.5% of the congestion values is the highest one congestion value (i.e., the closest integer to (0.005*20)). This is indicated in the second column of table 420. The highest 10% of the congestion values is the highest 2 congestion values (i.e., 0.10*20). This is also indicated in the second column of table 420. The corresponding ACE metric is the average of the congestion values specified by the percentage. That is, because ACE(0.5) implicates the highest one congestion value in table 410, that value is 1.1, which corresponds to an ACE metric of 110%, as shown in the third column of table 420. Because ACE(10) implicates the highest two congestion values in table 410, the average of those two congestions values, 1.1 and 0.9, which is 1.0 (i.e., 100%), is the ACE metric shown in the third column of table 420.

While 0.5, 1, 10, and 20 are the percentages used in the exemplary case shown in table 420, other numbers of percentages and other values for those percentages can be used. For example, four exemplary percentages p1, p2, p3, and p4 are indicated in the computation of wACE in FIG. 4. As indicated, the average of the obtained ACE metrics ACE(p1), ACE(p2), ACE(p3), and ACE(p4) is used to determine the wACE metric. Other exemplary values of p1, p2, p3, and p4 can be 0.5, 1, 2, and 5. When the congestion values obtained for the g-cells 310 of a given metal layer 125 are used to obtain wACE, that is the standard wACE metric value. However, the same processes discussed in the example can be used to determine the new metric by first scaling the congestion values in table 410 based on the corresponding penalty value determined at block 250 (FIG. 2). That is, the congestion values in table 410 for only the edges 330 that correspond with a hotspot cluster 510 (FIG. 5) are multiplied by the penalty calculated for that hotspot cluster 510, as detailed with reference to FIGS. 5 and 6, prior to obtaining the ACE values. Specifically, the usage is scaled by the penalty at the hotspot edges 330. Every edge 330 associated with a given hotspot has the corresponding congestion value scaled (i.e., multiplied) by the same penalty value. The average of the ACE metric values then provides the new metric (at block 270).

Figure 5:
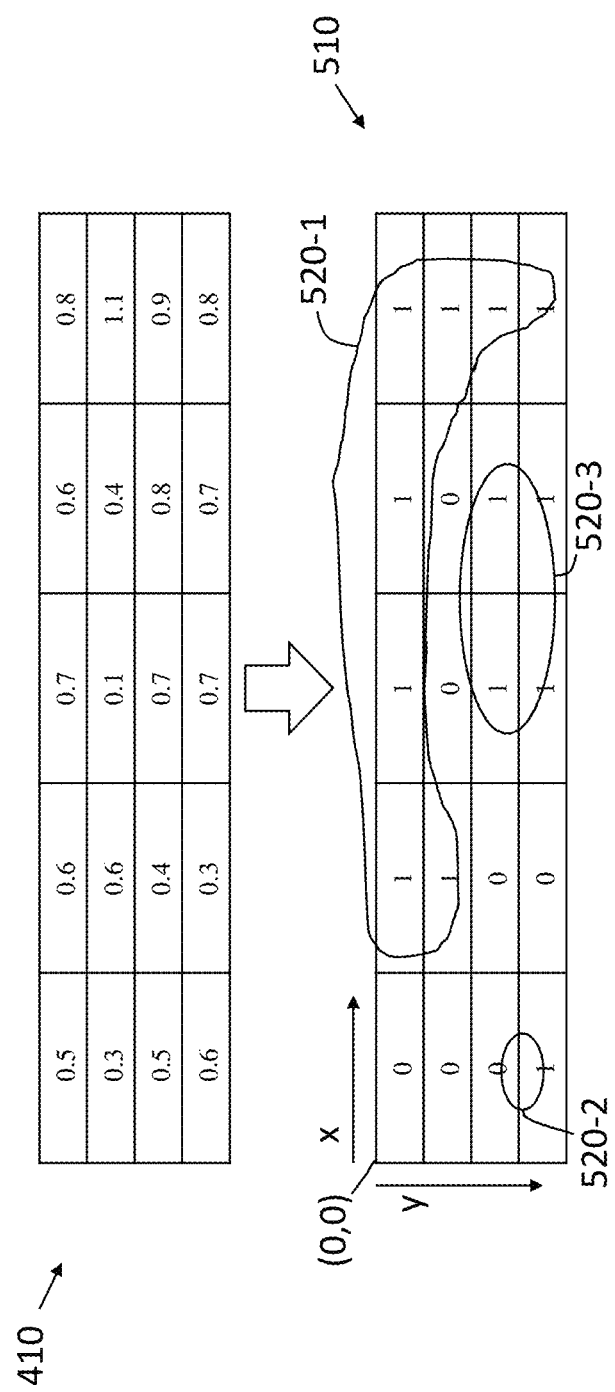
FIG. 5 illustrates an exemplary determination of hotspot cluster size in the process flow shown in FIG. 2.

FIG. 5 illustrates an exemplary determination of hotspot cluster size, at block 220 (FIG. 2). Table 410, which shows the congestion values computed according to the process discussed with reference to FIG. 3 (at block 210, FIG. 2), is used again. Table 510 shows the result of applying a threshold to the congestion values in table 410 to identify hotspots. Hotspots are indicated by a "1" in table 510. Hotspots are edges 330 with a congestion value (in table 410) that exceeds a threshold value. In the exemplary case illustrated in FIG. 5, the threshold value is 0.5. Thus, only congestion values shown in table 410 that are greater than 0.5 are replaced with a "1" and other congestions values in table 410 are replaced with a "0."

Three clusters 520-1, 520-2, 520-3 (generally referred to as 520) of hotspots is indicated in table 510. Any clustering algorithm can be used to identify clusters 520 of hotspots. An exemplary clustering algorithm considers the table 510 as a two-dimensional matrix with x=0 and y=0 (i.e., (x, y)=(0, 0)) at the top left corner, as shown. In the example, the value of x increases from 0 to 4 and the value of y increases from 0 to 3. In the exemplary clustering algorithm, a cluster begins at a column starting with a "1" (e.g., the second column or (1,0)), ends when a "0" is reached (at (1,2)) and then goes back to y=0 in the next column if it includes a "1" (2,0). As the proximity of clusters 520-1 and 520-3 in the exemplary case indicates, simply considering congestion in a metric (standard wACE) would not convey the challenge of routing presented in the metal layer 125 represented in FIG. 5. Once the clusters 520 of hotspots are identified, their size and center can be determined using a number of algorithms. For example, the center of the cluster 520 can be determined as the median x and median y values associated with the cluster 520. According to one or more embodiments of the invention, the hotspot clusters 520 are used to determine an additional penalty (at block 250) that is represented in the new metric (at block 270). The additional processes involved in determining the penalty are discussed with reference to FIG. 6.

Figure 6:
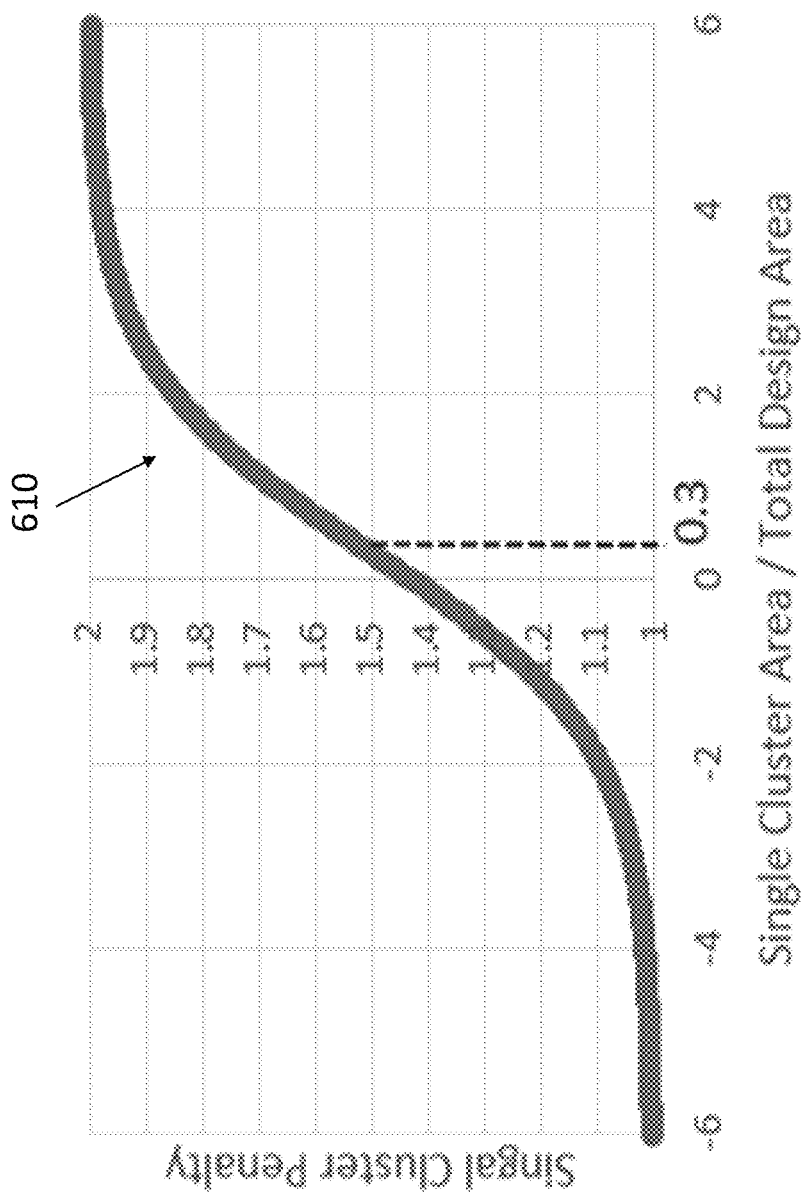
FIG. 6 is an exemplary shifted sigmoid function that can be used to determine the penalty resulting from hotspots identified during congestion analysis according to embodiments of the invention.

FIG. 6 is an exemplary shifted sigmoid function 610 that can be used to determine the penalty resulting from hotspots identified during congestion analysis according to embodiments of the invention. The size of a hotspot cluster 520 refers to the number of edges 330 involved. For example, in FIG. 5, the size of the cluster 520-1 is 8 (i.e., cluster area=8) while the total number of edges 330 for the metal layer 125 considered in the example is 20 (i.e., total area=20). The penalty calculation can be performed only for clusters 520 with a cluster area exceeding a threshold area. Depending on the threshold, a penalty may not be calculated for the cluster 520-2 of only one hotspot, for example.

The normalizing (at block 230, FIG. 2) is done for each hotspot cluster 520 for which a penalty is determined (at block 250). The output of the normalizing, at block 230, is given by:

$$X = \frac{\text{cluster area}}{\text{total area}} - \text{penalty\_shift} \quad [\text{EQ. 1}]$$

The penalty_shift parameter in EQ. 1 is an indication of how much (or how little) of a penalty should be imposed on a hotspot cluster 520. The penalty_shift value is correlated with the threshold value applied to congestion values to identify hotspots. The value of the penalty_shift parameter can be determined experimentally and, according to an exemplary embodiment, can be a value between 0 and 1. In the exemplary shifted sigmoid function 610, the value of penalty_shift is indicated as 0.3. Obtaining the shifted sigmoid function 610 for an exemplary single cluster 520 of hotspots refers to obtaining X (more particularly, X+penalty_shift) versus penalty, where a penalty is calculated as:

$$\text{penalty} = 1 + \frac{\text{alpha}}{1 + e^{-(X)}} \quad [\text{EQ. 2}]$$

The alpha parameter in EQ. 2 controls the maximum penalty value range and, like the penalty_shift parameter, can be determined experimentally. A relatively larger alpha value means that a given hotspot cluster 520 will be penalized more. In an exemplary embodiment, the alpha parameter has a value greater than 0. In the exemplary shifted sigmoid function 610, the value of alpha is 1. Once the penalty is determined (at block 250), application of the penalty to determine the new metric (at block 270) can be performed according to two or more embodiments, as discussed with reference to FIG. 2.

According to one exemplary embodiment of the invention, the scaling, at block 265, is used on the standard wACE metric determined at block 260. This scaling refers to multiplying the standard wACE metric for a given metal layer 125 by a cluster_penalty value determined for that metal layer 125. The cluster_penalty value for a given metal layer 125 is given by:

$$\text{cluster\_penalty} = \Sigma_{i \in clusters} \text{penalty}(i) * w(i) \quad [\text{EQ. 3}]$$

That is, the penalties for each of the clusters 520 of hotspots, which are computed according to EQ. 2 or obtained from the shifted sigmoid function 610, are weighted and summed. The weighting w(i), indicates the size and intensity of the cluster 520. The new metric is a multiple of the cluster_penalty and the standard wACE metric for each metal layer 125. According to another exemplary embodiment, the penalty associated with a cluster 520 of hotspots, which are associated with a set of edges 330, is used to scale the congestion value for each of that set of edges 330. This scaled congestion value is used in the process described with reference to FIG. 4 to determine wACE, which will be the new metric rather than the standard metric.

Figure 7:
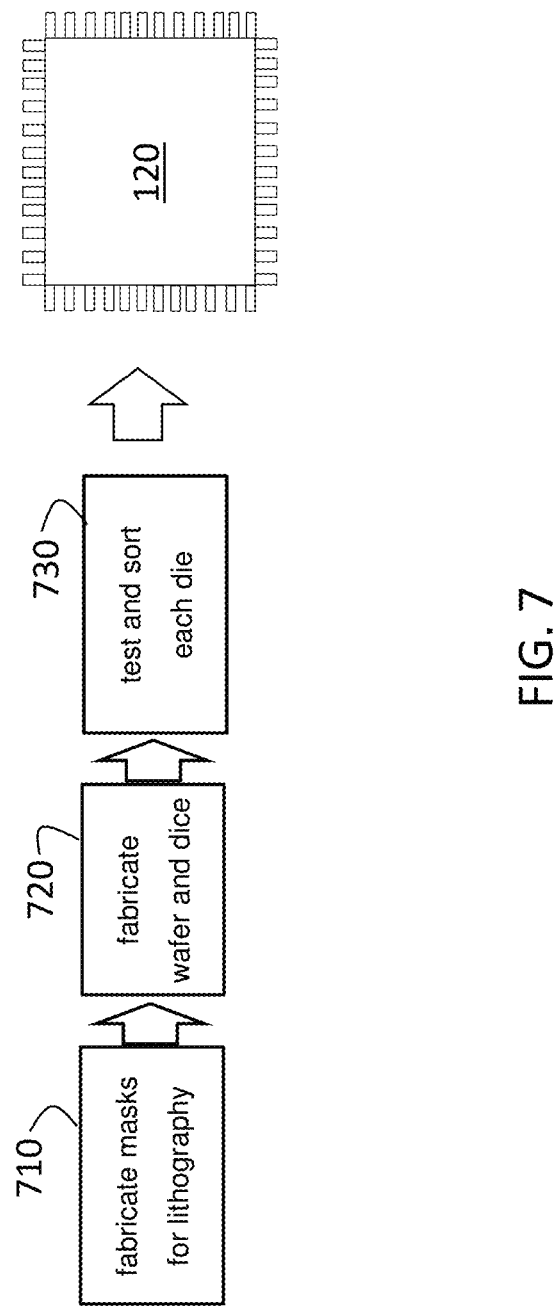
FIG. 7 is a process flow of a method of fabricating the integrated circuit designed according to one or more embodiments of the invention.

FIG. 7 is a process flow of a method of fabricating the integrated circuit 120 designed according to one or more embodiments of the invention. Once the physical synthesis phase and other phases are completed, based, in part, on the identification of hotspots during congestion analysis according to one or more embodiments of the invention, the processes shown in FIG. 7 can be performed to fabricate the integrated circuit 120. Generally, a wafer with multiple copies of the final design is fabricated and cut (i.e., diced) such that each die is one copy of the integrated circuit 120. At block 710, the processes include fabricating masks for lithography based on the finalized physical layout. At block 720, fabricating the wafer includes using the masks to perform photolithography and etching. Once the wafer is diced, testing and sorting each die is performed, at block 730, to filter out any faulty die.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of performing physical design of an integrated circuit, the method comprising:
   subdividing each metal layer of a plurality of metal layers of the integrated circuit into a plurality of g-cells, wherein each metal layer has either horizontal tracks or vertical tracks, the plurality of g-cells of the plurality of metal layers with horizontal tracks have vertical edges between adjacent ones of the plurality of g-cells, and the plurality of g-cells of the plurality of metal layers with vertical tracks have horizontal edges between adjacent ones of the plurality of g-cell s;
   determining congestion for each metal layer as congestion values associated with the horizontal edges or the vertical edges of the metal layer;
   identifying hotspots of each metal layer based on the congestion values of the metal layer;
   determining a penalty associated with the hotspots of each metal layer;
   determining a congestion metric for each metal layer based on the penalty; and performing routing of wires of the integrated circuit based on the congestion metric, wherein a comparison of the congestion metric of a first metal layer among the plurality of metal layers to the congestion metric of a second metal layer among the plurality of metal layers indicates whether the routing of the wires is preferable in the first metal layer or in the second metal layer.

2. The computer-implemented method according to claim 1, further comprising fabricating the integrated circuit based on the performing the routing.

3. The computer-implemented method according to claim 1, wherein the determining the congestion includes computing the congestion value for each of the horizontal edges as a number of the vertical tracks used for wires divided by a total number of the vertical tracks minus a number of the vertical tracks that are blocked or for each of the vertical edges as a number of the horizontal tracks used for wires divided by a total number of the horizontal tracks minus a number of the horizontal tracks that are blocked.

4. The computer-implemented method according to claim 3, wherein the identifying the hotspots for each metal layer includes identifying the congestions values that exceed a threshold value.

5. The computer-implemented method according to claim 4, further comprising identifying one or more clusters of hotspots in each metal layer to include one or more hotspots each and determining a size of each cluster of the one or more clusters of hotspots as a number of the hotspots in the cluster.

6. The computer-implemented method according to claim 5, wherein the determining the penalty associated with the hotspots of each metal layer includes determining a shifted sigmoid function for each cluster of the one or more clusters of hotspots based on a ratio of the size of each cluster to a number of the horizontal edges or the vertical edges of the metal layer.

7. The computer-implemented method according to claim 1, wherein the determining the congestion metric for each metal layer includes scaling a standard metric determined using the congestion values by the penalty or scaling the congestion values by the penalty.

8. A system to perform physical design of an integrated circuit, the system comprising:
a memory device configured to store a design resulting from subdividing each metal layer of a plurality of metal layers of the integrated circuit into a plurality of g-cells, wherein each metal layer has either horizontal tracks or vertical tracks, the plurality of g-cells of the plurality of metal layers with horizontal tracks have vertical edges between adjacent ones of the plurality of g-cells, and the plurality of g-cells of the plurality of metal layers with vertical tracks have horizontal edges between adjacent ones of the plurality of g-cells; and
a processor configured to determine congestion for each metal layer as congestion values associated with the horizontal edges or the vertical edges of the metal layer, to identify hotspots for each metal layer based on the congestion values of the metal layer, to determine a penalty associated with the hotspots of each metal layer, to determine a congestion metric for each metal layer based on the penalty, and to perform routing of wires of the integrated circuit based on the congestion metric, wherein a comparison of the congestion metric of a first metal layer among the plurality of metal layers to the congestion metric of a second metal layer among the plurality of metal layers indicates whether the routing of the wires is preferable in the first metal layer or in the second metal layer.

9. The system according to claim 8, wherein the integrated circuit is fabricated based on the routing.

10. The system according to claim 8, wherein the processor is configured to determine the congestion based on computing the congestion value for each of the horizontal edges as a number of the vertical tracks used for wires divided by a total number of the vertical tracks minus a number of the vertical tracks that are blocked or for each of the vertical edges as a number of the horizontal tracks used for wires divided by a total number of the horizontal tracks minus a number of the horizontal tracks that are blocked.

11. The system according to claim 10, wherein the processor is configured to identify the hotspots for each metal layer based on identifying the congestions values that exceed a threshold value.

12. The system according to claim 11, wherein the processor is configured to identify one or more clusters of hotspots in each metal layer to include one or more hotspots each and to determine a size of each cluster of the one or more clusters of hotspots as a number of the hotspots in the cluster.

13. The system according to claim 12, wherein the processor is configured to determine the penalty associated with the hotspots of each metal layer by determining a shifted sigmoid function for each cluster of the one or more clusters of hotspots based on a ratio of the size of each cluster to a number of the horizontal edges or the vertical edges of the metal layer.

14. The system according to claim 8, wherein the processor is configured to determine the congestion metric for each metal layer based on scaling a standard metric determined using the congestion values by the penalty or scaling the congestion values by the penalty.

15. A computer program product for performing physical design of an integrated circuit, the computer program product comprising a computer readable storage medium having program instructions embodied therewith, the program instructions executable by a processor to perform a method comprising:
subdividing each metal layer of a plurality of metal layers of the integrated circuit into a plurality of g-cells, wherein each metal layer has either horizontal tracks or vertical tracks, the plurality of g-cells of the plurality of metal layers with horizontal tracks have vertical edges between adjacent ones of the plurality of g-cells, and the plurality of g-cells of the plurality of metal layers with vertical tracks have horizontal edges between adjacent ones of the plurality of g-cell s;
determining congestion for each metal layer as congestion values associated with the horizontal edges or the vertical edges of the metal layer;
identifying hotspots of each metal layer based on the congestion values of the metal layer;
determining a penalty associated with the hotspots of each metal layer;
determining a congestion metric for each metal layer based on the penalty; and
performing routing of wires of the integrated circuit based on the congestion metric, wherein a comparison of the congestion metric of a first metal layer among the plurality of metal layers to the congestion metric of a second metal layer among the plurality of metal layers indicates whether the routing of the wires is preferable in the first metal layer or in the second metal layer.

16. The computer program product according to claim 15, further comprising fabricating the integrated circuit based on the performing the routing.

17. The computer program product according to claim 15, wherein the determining the congestion includes computing the congestion value for each of the horizontal edges as a number of the vertical tracks used for wires divided by a total number of the vertical tracks minus a number of the vertical tracks that are blocked or for each of the vertical edges as a number of the horizontal tracks used for wires divided by a total number of the horizontal tracks minus a number of the horizontal tracks that are blocked.

18. The computer program product according to claim 17, wherein the identifying the hotspots for each metal layer includes identifying the congestions values that exceed a threshold value.

19. The computer program product according to claim 18, further comprising identifying one or more clusters of hotspots in each metal layer to include one or more hotspots each and determining a size of each cluster of the one or more clusters of hotspots as a number of the hotspots in the cluster, wherein the determining the penalty associated with the hotspots of each metal layer includes determining a shifted sigmoid function for each cluster of the one or more clusters of hotspots based on a ratio of the size of each cluster to a number of the horizontal edges or the vertical edges of the metal layer.

20. The computer program product according to claim 15, wherein the determining the congestion metric for each metal layer includes scaling a standard metric determined using the congestion values by the penalty or scaling the congestion values by the penalty.

\* \* \* \* \*